R. F. BACON.
FLOTATION OF MINERALS.
APPLICATION FILED AUG. 14, 1914.
1,140,866.
Patented May 25, 1915.
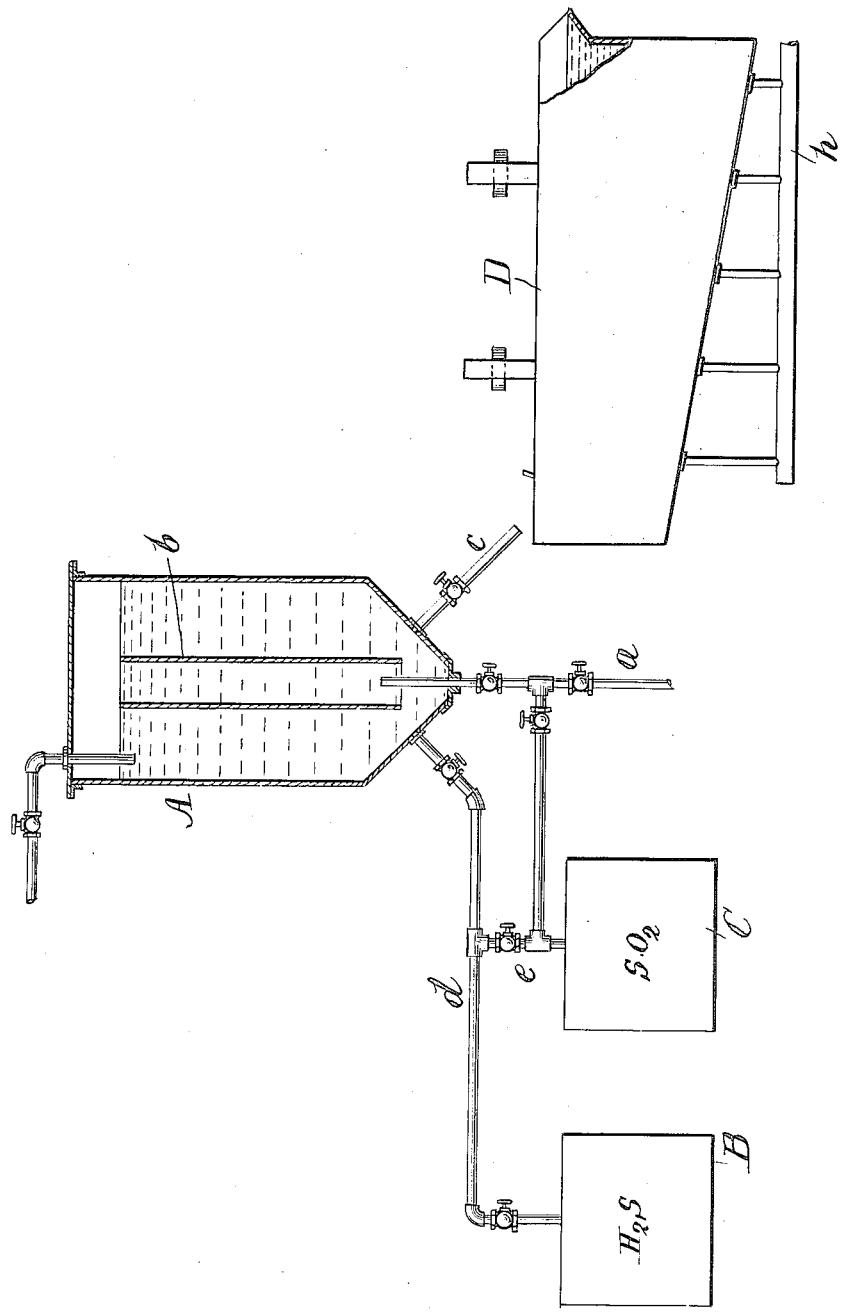

UNITED STATES PATENT OFFICE.

RAYMOND F. BACON, OF PITTSBURGH, PENNSYLVANIA, ASSIGNOR TO METALS RESEARCH COMPANY, OF NEW YORK, N. Y., A CORPORATION OF MAINE.

FLOTATION OF MINERALS.

1,140,866.  Specification of Letters Patent.  Patented May 25, 1915.

Application filed August 14, 1914. Serial No. 856,772.

*To all whom it may concern:*

Be it known that I, RAYMOND F. BACON, a citizen of the United States, residing at No. 4909 Forbes street, Pittsburgh, Allegheny county, State of Pennsylvania, have invented certain new and useful Improvements in Flotation of Minerals; and I do hereby declare the following to be a full, clear, and exact description of the invention, such as will enable others skilled in the art to which it appertains to make and use the same.

It has been heretofore proposed to effect the flotation and separation of oxidized ores from the gangue with which they are associated by first converting the oxidized ores, in a finely divided condition, into sulfids by the action of a soluble sulfid, such as hydrogen sulfid, and then subjecting the ore to any of the familiar processes for effecting the separation of sulfids from gangue.

The present invention is based upon the discovery that processes of this general character, which are usually inefficient and impracticable for commercial purposes are rendered feasible by neutralizing the excess of hydrogen sulfid present and simultaneously making the solution faintly acid. By so doing, it is found that a much sharper and cleaner separation is obtained of the floated sulfids from the accompanying gangue, and that the proportion of sulfids recovered as concentrates, and the relatively small amount lost in the tailings contribute to make the process commercially remunerative in cases where it would otherwise fail of acceptance.

In order to remove the excess of hydrogen sulfid, I prefer to employ sulfur dioxid, which may usually be obtained, in metallurgical plants, from waste fumes of furnaces for roasting ore or the like, but which may be obtained from any other convenient source. The sulfur dioxid is admitted into the solution containing the excess of hydrogen sulfid, until the solution is rendered faintly acid and the excess of hydrogen sulfid removed.

It will, of course, be understood that the preliminary operation of converting the oxidized ores either wholly or superficially into sulfids, may be effected either by the admission of hydrogen sulfid *per se*, or by the admission of any other soluble sulfid, inasmuch as a soluble sulfid is at once hydrolyzed upon being brought into solution in water.

As an example of a method of carrying out this invention, such as to enable those skilled in the art to practice it, I will cite the following: One ton of oxidized copper ore containing 2% of copper and crushed to pass 60 mesh screens is placed in a Pachuca tank with three tons of water. The air is then turned on and the ore and water agitated for a few minutes, just enough to obtain a good mixture of the ore and water. Immediately after the violent agitation has ceased and while considerable of the ore is still in suspension, hydrogen sulfid is forced into the body of ore and water through suitable inlet pipes in the bottom of the Pachuca tank. With the ore used in this experiment 60 cubic feet of hydrogen sulfid was admitted. This amount of hydrogen sulfid is not sufficient to convert all the oxidized copper present into the sulfid, but for purposes of flotation this is not necessary. It is only necessary to form a surface film of copper sulfid surrounding each oxidized particle. The mixture of ore and water is allowed to stand a few minutes with the hydrogen sulfid, then a slight excess of sulfur dioxid is run in through suitable inlet pipes in the bottom of the Pachuca tank. The sulfur dioxid used for this purpose may be the pure gas or dilute impure gases such as smelter fumes. In case the latter are used, they may be introduced in place of the air to effect the agitation of the mixture. A short time after the introduction of the sulfur dioxid the mixture of ore, water, etc., is tested for example with lead acetate paper and when the hydrogen sulfid has disappeared the mixture is allowed to flow into a flotation tank, where the sulfid coated copper oxid, carbonate, and silicate particles are floated off and thus separated from the gangue. With the particular ore cited, a recovery of 83% of the copper was thus effected, the concentrate containing 21% copper.

It will of course be understood that different ores will require difference in treatment as to the amount of hydrogen sulfid introduced, the length of time necessary for the hydrogen sulfid to act on the ore, and the amount of sulfur dioxid necessary subsequently to destroy the remaining hydrogen sulfid. I do not, therefore, limit myself in regard to these variable factors. It will be found also that some ores give better results on flotation when the solution is neutral or faintly alkaline than from an acid solution. In such cases the solution is neutralized or made alkaline after the action of the sulfur dioxid has ceased and before passing to the flotation cells. As a general rule, however, clearer separations will be obtained in flotation when the solution is slightly acid and the acidity imparted by the sulfur dioxid is usually sufficient for the purpose. The prime function of the sulfur dioxid is to destroy the excess of hydrogen sulfid as this gas in solution is usually a poison in flotation processes.

In the accompanying drawing, I have illustrated, partly in section and partly in elevation, an arrangement of apparatus suitable for the practice of the invention. It will be understood, however, that the invention is not limited to any particular specific form or forms of apparatus.

In the drawing, A represents a Pachuca tank for receiving the water and oxidized copper ore, said tank being provided with the usual air jet $a$ and circulation pipe $b$ to obtain the circulation desirable for obtaining a good mixture of the ore and water.

B indicates a supply tank or reservoir for hydrogen sulfid, and C indicates a tank or reservoir for the supply of sulfur dioxid, suitable valved connections $d$, $e$, being provided as shown, for the admission of the hydrogen sulfids and the sulfur dioxid into the interior of the Pachuca tank. The supply pipe for sulfur dioxid may, as shown, be connected to the inlet pipe $a$.

$c$ indicates a discharge conduit for conveying the contents of the Pachuca tank to a flotation cell D, which may be of any suitable type.

It is of course understood that the gases may be introduced into the wet ore in many suitable forms of apparatus and I do not limit myself to any one form such as the one cited. The mixture of ore and water to be acted upon by hydrogen sulfid and subsequently by sulfur dioxid may be at the ordinary temperature, which is usually preferable or it may be at an elevated temperature which may be found advantageous with certain types of ore.

What I claim is:

1. The method of effecting the separation of oxidized ores from associated gangue, which consists in subjecting the mixture, in a finely divided condition, to the action of a soluble sulfid, thereby effecting a conversion of the oxidized ore into sulfids, and then converting the hydrogen sulfid present into constituents innocuous to flotation, and finally subjecting the mixture to flotation; substantially as described.

2. The method of effecting the separation of oxidized ores from associated gangue, which consists in subjecting the mixture, in a finely divided condition, to the action of a soluble sulfid, thereby effecting a conversion of the oxidized ore into sulfids, then converting the hydrogen sulfid present into constituents innocuous to flotation, and making the solution faintly acid, and finally subjecting the mixture to flotation; substantially as described.

3. The method of effecting the separation of oxidized ores from associated gangue, which consists in subjecting the mixture, in a finely divided condition, to the action of a soluble sulfid, thereby effecting a conversion of the oxidized ore into sulfids, then converting the hydrogen sulfid present into constituents innocuous to flotation, and making the solution faintly acid by the admission of sulfur dioxid, and finally subjecting the mixture to flotation; substantially as described.

In testimony whereof I affix my signature, in presence of two witnesses.

RAYMOND F. BACON.

Witnesses:
N. A. PARKINSON,
E. B. TELFORD.